Oct. 22, 1946.          M. S. RESINA          2,409,899
                          CAP CHUCK
             Filed June 8, 1944         2 Sheets-Sheet 1
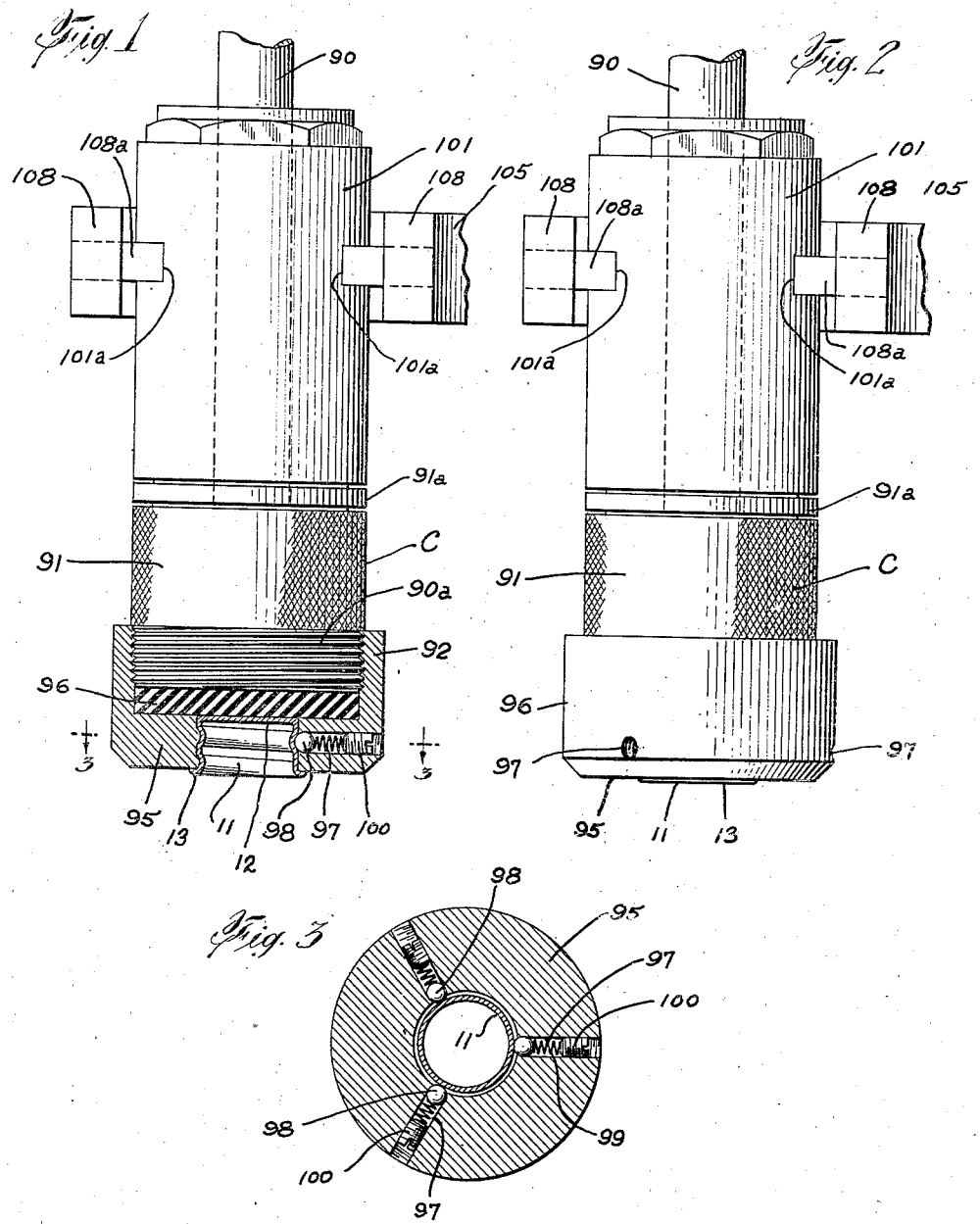
INVENTOR.
Manuel S. Resina
BY Richard S. Temko
ATTORNEY.

Oct. 22, 1946.  M. S. RESINA  2,409,899
CAP CHUCK
Filed June 8, 1944  2 Sheets-Sheet 2
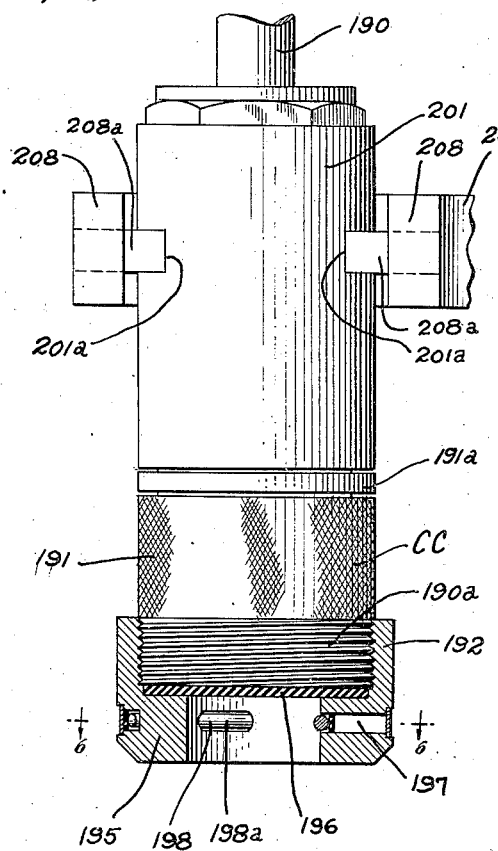
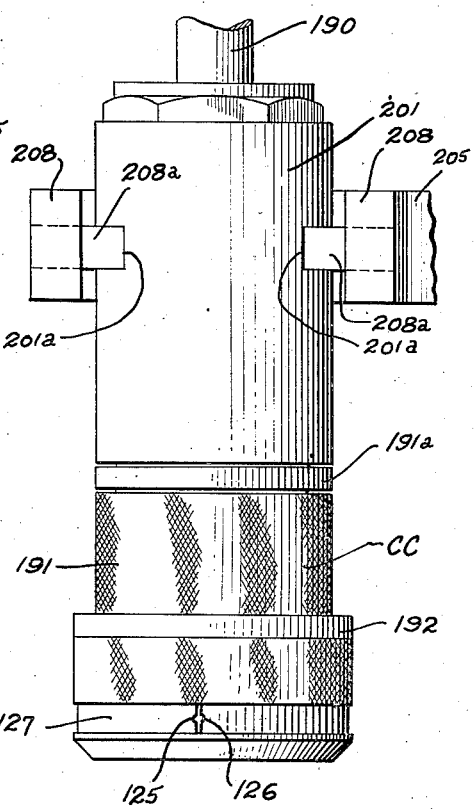
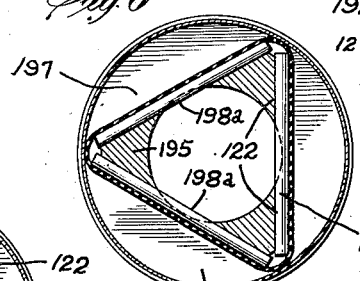
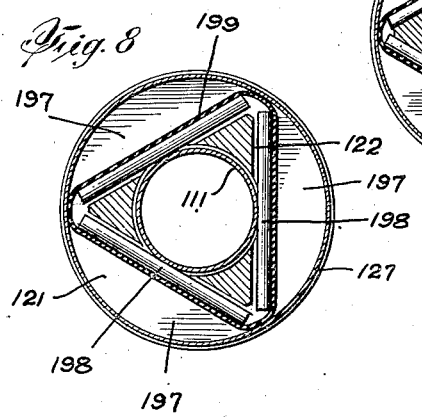
INVENTOR.
Manuel S. Resina
BY Richard S. Temko
ATTORNEY.

Patented Oct. 22, 1946

2,409,899

UNITED STATES PATENT OFFICE 2,409,899

CAP CHUCK

Manuel S. Resina, Brooklyn, N. Y.

Application June 8, 1944, Serial No. 539,260

11 Claims. (Cl. 226—88)

This invention relates generally to chucks and more particularly to chucks known as cap applying chucks. Such chucks find considerable utility in connection with container capping machines in which a screw cap or similar closure is temporarily gripped by the chuck and is released by the chuck after the cap or closure has been properly secured in place over the entrance to the container.

The present application constitutes a continuation in part, of my application for a container capping machine or the like co-pending herewith, filed July 26, 1941 under Serial No. 404,160.

It is among the principal objects of the present invention to provide cap chuck constructions wherein the cap is frictionally engaged by the chuck, with sufficient friction so that the chuck does not become undesirably displaced from or released by the chuck and yet in which the degree of friction may be so adjusted that when the chuck is used with metal caps the lacquer or enamel coating thereon, is not damaged by the gripping members, and similarly when the chuck is used with caps composed of plastic materials of a relatively fragile character, said caps are not damaged or cracked.

Another object herein lies in the provision of chuck structures of the class described, wherein upon the full and proper seating of the cap or closure with the opening or neck edge of the container with which the cap is used, the gripping action ceases and the chuck may be rotated an excessive amount without damaging the cap or container even where they are composed of relatively fragile material as for example, Bakelite and glass, respectively.

Another object herein lies in the provision of chuck structures having a cushioning element adapted to prevent crushing, deformation, or breakage of the cap or container by virtue of excess pressure in a direction toward the container in the cap locating or cap seating operations with which such chucks are customarily utilized.

In order to accomplish the foregoing novel and useful results, it is necessary and desirable that the resilient means which actuate the gripping elements, be sensitive in character and such means have been obtained by the use of materials which are to some extent, subject to crystallization, fatigue or deterioration due to age. It is, therefore, among the objects herein to provide structure wherein said means may be conveniently and expeditiously replaced as required by conditions of use.

Another object herein lies in the provision of structure of the class described, wherein the effective gripping pressure and its consequent friction upon the cap, may be adjusted to suit various container capping conditions. A feature of the present invention lies in the fact that the chuck operates efficiently under long periods of continuous use and it makes accommodation for variations in size and shape of the caps such as occur in a plurality of caps when manufactured under ordinary commercial tolerances.

These objects and other incidental ends and advantages will more fully appear in the progress of this disclosure and be pointed out in the appended claims. In the drawings in which similar reference characters designate corresponding parts throughout the several views of each embodiment:

Figure 1 is a front fragmentary elevational view partly in section of a first embodiment of the invention.

Figure 2 is a fragmentary front elevational view of the first embodiment of the invention.

Figure 3 is a horizonal sectional view as seen from the plane 3—3 on Figure 1.

Figure 4 is a front fragmentary elevational view partly in section of a second embodiment of the invention.

Figure 5 is a fragmentary front elevational view of the second embodiment of the invention.

Figure 6 is a horizontal sectional view as seen from the plane 6—6 on Figure 4.

Figure 7 is a fragmentary vertical sectional view corresponding to Figure 4, but showing the cap as retained by the chuck.

Figure 8 is a horizontal sectional view corresponding to Figure 6 but showing the cap as retained by the chuck.

Turning now to the first embodiment of the invention illustrated in Figure 1, the chuck is indicated by the reference character C and for the purpose of more clearly understanding the manner in which the same is used, certain parts are shown for mounting and rotating the same and these correspond to the similar parts disclosed in my co-pending application Serial No. 404,160 referred to hereinabove. The shaft 90 is adapted to be rotated in such a direction that when the cap 11 is in the chuck, it may be turned so as to threadedly engage said cap upon the threaded neck of a bottle or similar container not shown.

Depending from the lower end of shaft 90 is the cap applying chuck C, said cap applying chuck C comprising cylindrical body member 91, having an external thread 90a, formed in the lower outer face thereof. An internally threaded sleeve member 92, having a lower inwardly projecting peripheral flange 95 engages the thread 90a of the body member 91, and has positioned between the upper face of the flange 95, and the bottom face of the body member 91, a gasket 96 of rubber or similar material. Formed in the flange 95 are a plurality of horizontal and centrally radiating bores 97, said bores 97 having their inner end edges slightly constricted. Positioned in each of said bores is a ball bearing 98, a compression spring 99, said compression spring having one end pressing against the inner face of the screw 100 and forcing the ball bearing 98 towards the axis of the chuck, the ball bearing being retained within the bore since the inner constricted edge of said bore is of slightly less diameter than the ball bearing.

A vertical bushing member 101 rotationally engages the shaft 90 above body member 91, and has the ball bearing member 91a positioned between body member 91 and bushing 101, said bushing member having a pair of parallel horizontal grooves 101a formed therein. The chuck oscillating arm is indicated by reference character 105. The forward end of the arm 105 is forked and said fork 108 has a pair of parallel bar members 108a pivotally mounted at the ends of said fork members, said bar members engaging the bushing grooves 101a.

In one manner of use, the cap applying chuck C may be caused to periodically move up and down by suitable means such as a cam (not shown) through the arm 105, the vertical movement of said chuck being from its topmost position down to a cap receiving position up to its topmost position, down to a cap applying position and thence back to its topmost position. When the chuck C comes down and engages a cap held on a suitable holder (not shown), the ball bearings 98 resiliently grip the cap and lift it from the said holder, which holder may then be moved from the path of the chuck. Thereafter, the rotating chuck, driven by rotated means (not shown), moves downwardly and applies the held cap 11 to a bottle (not shown) held in position, and when the cap has been sufficiently secured the balls 98 are forced outwardly against the action of the springs 99, thus causing slippage between the chuck C and the cap. After the cap has been applied, the chuck returns to the upper position and is ready to begin another cycle.

The gasket 96 operates as a resilient member performing a number of functions. First, it forms an auxiliary gripping means which engages the upper surface of the top wall 12 of the cap 11, thereby requiring less effective frictional engagement between the ball bearings 98 and the outer surface of the cylindrical side wall of the cap. By virtue of the greater distribution of frictional effect thus obtained, the surface pressure at the points of contact between the balls and the cap may be reduced with a consequently greater sensitivity of the chuck and less likelihood of damage to the cap. Second, the resilient member or gasket 96 allows for some variations in movement of the arm 105 without damaging the cap, since effective engagement between the chuck and the cap may be obtained even when the lower rim 13 of the cap 11 does not engage the lowermost surface of the sleeve member 92. Third, the resilient member 96 also has a frictional action between the lowermost surface of the body member 91 and the upper surface of the flange 95 so that the sleeve 192 may be axially rotated to vary the effective length of the chuck and hence the point at which the lower surface of the flange 95 will engage the upper surface of the lower rim 13.

Turning now to the second embodiment of the invention illustrated in Figures 4 to 8 inclusive, for the purpose of avoiding unnecessary repetition, certain parts corresponding to those described in connection with the first embodiment of the invention, are given the same reference character with the addition of the prefix "1", or "2."

The chuck CC has a body member 191 of generally cylindrical shape, having an external thread 190a formed in the lower outer surface thereof. An internally threaded sleeve member 192, having a lower inwardly projecting peripheral flange 195, engages the thread 190a of the body member 191. Disposed between the upper face of the flange 195 and the bottom face of the body member 191 is a cushioning member or gasket 196 which may be composed of rubber or other similar compressible resilient material. The flange 195 is provided with a plurality of horizontally disposed slots or openings 197, having upper and lower walls 120 and 121 respectively, and inner walls 122. As best seen in Figure 6 in the embodiment shown, there are three such slots and the slots are of such depth that they open into the circular orifice formed by the circular wall at the inner edge of the inwardly extending peripheral flange 195. The depth of the slots 197 is so arranged with relation to the inner wall of the flange 195, that the gripping members 198 project inwardly beyond the inner wall of the flange 195 a short distance when said gripping members are fully seated against the inner walls 122. The gripping members 198 are resiliently retained in the innermost positions thereof by the action of the contractile resilient means 199. The means 199 may be an elastic rubber band having a width (height as viewed in Figure 7) substantially equal to the distance between the upper walls 120 and the lower walls 121. The total annular length of the band 199 in its unstressed condition and the thickness and composition of the material of which it is composed, will govern the compressive force which the portions 198a exert against the cap 111 when frictionally engaging the same. The band 199 also acts by virtue of the configuration of the parts which it engages, to restrain movements of the gripping members 198 longitudinally of themselves. The gripping members 198 may be in the form of short lengths of rod of small diameter and are preferably of a lesser diameter than the distance between the top walls 120 and the bottom walls 121 so that said gripping members may have a relatively free movement, controlled only by the action of the resilient band 199 and limited in inward travel by the inner walls 122. The outer wall of the sleeve member 192 is provided with an annular groove within which is disposed a circular cover strip 127, which may be composed of spring metal having the terminals 125 and 126. When it becomes desirable to replace the contractile means 199, it becomes necessary only to separate the terminals 125 and 126 and to spring the circular cover strip 127 out of its seat. After the element 199 has been replaced, the cover strip 127 may be snapped back into place.

By virtue of the shape of the gripping members 198, they are free to roll within their sockets and thus present new surfaces for wear as they are used. Should undue wear occur, the gripping members 198 may be replaced in a manner similar to that described in connection with the replacement of the resilient means 199.

The gasket 196 acts as a compressible resilient element in a number of different manners. Where the cap chuck is used in connection with caps which have a flat upper surface, the lower surface of the gasket 196 frictionally engages the upper surface of the cap, particularly the top wall 112 of the cap 111, thereby requiring less effective frictional engagement between the gripping portions 198a and the outer surface of the cylindrical side wall of the cap. This construction and mode of operation produces a more wide distribution of frictional effect, with a consequent lessening of the requirement of greater pressure at individual points of contact. This results in a lessened pressure between the portions 198a and the external surfaces of the side walls of the cap without undesired slippage when it is desired that the chuck positively engage the cap so that the two rotate together. Reduction of point pressure on the cap is desirable since the cap is subject to less strain and is less likely to break or have its surface marred. The resilient element 196 also permits variation in the movement of the arm 205, since effective engagement between the chuck and cap may be obtained even when the lower rim 113 of the cap is not engaged by the lowermost surface of the flange 195. By virtue of the action of the resilient member 196 there is a frictional engagement between the lowermost surface of the body member 191 and the upper surface of the element 196; also there is a frictional engagement between the upper surface of the flange 195 and the lower surface of the element 196. Since the part 196 is compressible, a locking type action is obtained which tends to retain the sleeve member 192 in different rotated positions thereof. This provides, therefore, for varying the effective length of the entire device and permits an auxiliary adjustment independent of the adjustment of cams or other means not shown, which control the lowermost position of the entire screw cap chuck by their action upon the arm 205. Such adjustment will, in effect, vary the point at which the lower surface of the flange 195 will engage the upper surface of the lower rim 13 of the cap 111 when the cap is engaged by the chuck with the cap in a relatively stationary position.

It may thus be seen that I have provided novel and useful screw cap constructions which, by virtue of the simplicity thereof, are easily constructed at relatively low cost and are substantially foolproof in operation. By virtue of the sensitivity of action thereof, fragile or caps with delicate coatings may be handled with a minimum of breakage and marring. When adjustment is needed to vary the effective gripping pressure thereof, this is readily accomplished in a simple manner. Parts which are subject to wear or deterioration in use, can be quickly and easily replaced. After the cap chuck is associated with any suitable device for operating and driving the same, adjustments can be made in the effective size of the cap chuck or the interrelated arrangement of its parts so that certain variations in the machine which drives the cap chuck or in the caps or containers with which the cap chuck is used, may be accommodated.

I wish it to be understood that I do not desire to be limited to the exact details of construction shown and described for obvious modifications will occur to a person skilled in the art.

I claim:

1. In a machine of the character described, a rotating cap applying chuck, said chuck having an aperture formed in the base thereof, said chuck having a plurality of radiating bores formed in the wall surrounding the aperture, said bores terminating at the face of said aperture, rollable cap gripping means located within said bores and means within said bores for resiliently projecting said cap gripping means into said aperture.

2. In a machine of the character described, a rotating cap applying chuck comprising a rotating body member, a collar member positioned at the lower part of said body member and depending therefrom, the longitudinal axis of said collar member being aligned with the axis of rotation of the body member, said collar member having a horizontally inwardly projecting peripheral flange positioned at the lower portion thereof, said flange having a plurality of bores formed therein, said bores terminating at the inner face of said flange, rollable cap gripping means located within said bores and means within said bores for resiliently projecting said cap gripping means beyond the inner face of the said flange.

3. A cap applying chuck as claimed in claim 2, in which the inner ends of the bores are constricted, the cap gripping means comprise spheres whose diameters are greater than the constricted ends of the bores, the spheres being resiliently projected through the restricted ends of said bores by means of compression springs positioned within said bores.

4. A cap applying chuck comprising: a relatively stationary sleeve; an axle rotatably disposed within said sleeve; a chuck body secured to said axle; said chuck body having an aperture formed in the base thereof; said chuck body having a plurality of radiating bores extending outwardly from said aperture; independently rollable cap gripping means located within said bores; and means within said bores for resiliently projecting said cap gripping means into said aperture.

5. A cap applying chuck comprising: a relatively stationary sleeve; an axle rotatably disposed within said sleeve; a chuck body secured to said axle; said chuck body having an aperture formed in the base thereof; said chuck body having a plurality of openings extending outwardly from said aperture; independently rollable cap gripping means located within said openings; and means within said openings for resiliently projecting said cap gripping means into said aperture.

6. A rotatable cap applying chuck comprising: a rotatable body member; a collar member positioned at the lower part of said body member and depending therefrom, the longitudinal axis of said collar member being aligned with the axis of rotation of the body member, said collar member having a horizontal inwardly projecting peripheral flange positioned at the lower portion thereof; said flange having a plurality of openings formed therein, said openings terminating in and communicating with the inner face of said flange; rotatable cap gripping means located within each of said openings; and means disposed within said openings and outwardly of said cap gripping means acting to resiliently project said cap gripping means beyond the inner face of the said flange.

7. A rotatable cap applying chuck comprising: a rotatable body member; a collar member adjustably positioned at the lower part of said body member and depending therefrom, the longitudinal axis of said collar member being aligned with the axis of rotation of the body member, said collar member having a horizontal inwardly projecting peripheral flange positioned at the lower portion thereof; said flange having a plurality of openings formed therein, said openings terminating in and communicating with the inner face of said flange; rollable cap gripping means in the form of rods located within said openings and generally circumferentially arranged, the axes of said rods being tangential to the circumference of said cap when in the chuck; and means disposed within said openings and outwardly of said cap gripping means acting to resiliently project said cap gripping means beyond the inner face of the said flange.

8. In a machine of the character described, a rotating cap applying chuck, said chuck having an aperture formed in the base thereof, said chuck having a plurality of radiating bores formed in the wall surrounding the aperture, said bores each having a threaded portion and terminating at the face of said aperture, cap gripping means located within said bores, means within said bores for resiliently projecting said cap gripping means into said aperture, and a threaded plug disposed in each of said bores and adjustable in position in its respective bore to vary the effective pressure of the resilient means therein.

9. A structure as claimed in claim 8 in which the cap gripping means is rollable about an axis tangential to the circumference of said cap.

10. A structure as claimed in claim 8 in which the cap gripping means includes a plurality of spheres each rollable about an axis tangentially arranged with respect to the circumference of the cap.

11. A structure as claimed in claim 8 in which the cap gripping means includes a plurality of rods each rollable about an axis tangentially disposed with respect to the circumference of the cap.

MANUEL S. RESINA.